Figure 1:
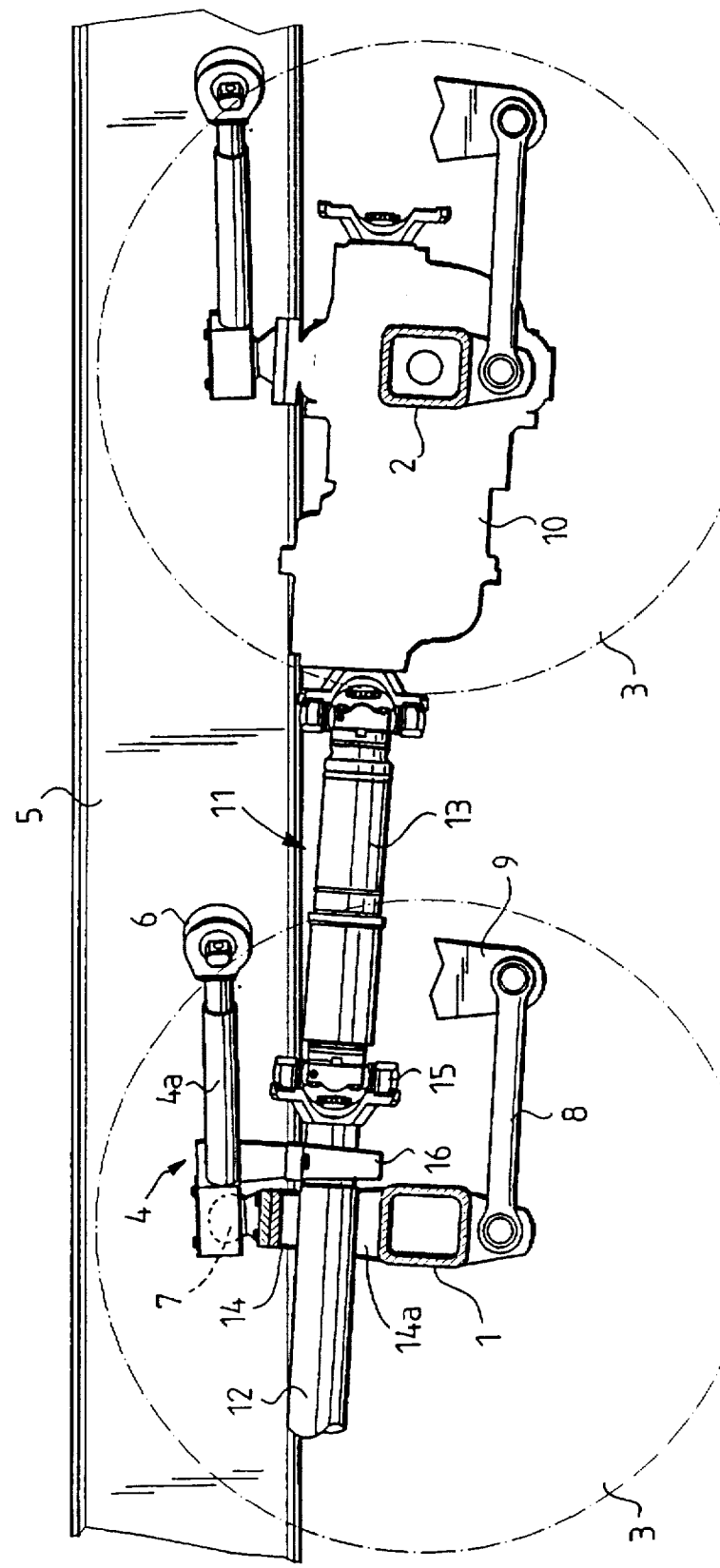

United States Patent [19]

Salo

[11] Patent Number: 5,775,458
[45] Date of Patent: Jul. 7, 1998

[54] SUPPORT ARRANGEMENT FOR A DIVIDED ARTICULATED SHAFT

[75] Inventor: Timo Salo, Mustio, Finland

[73] Assignee: Tamrock Oy, Tampere, Finland

[21] Appl. No.: 573,234

[22] Filed: Dec. 15, 1995

[30] Foreign Application Priority Data

Dec. 21, 1994 [FI] Finland .................. 946010

[51] Int. Cl.$^6$ .................................................. B60K 17/24
[52] U.S. Cl. .......................... 180/374; 180/22; 180/344; 180/376; 301/124.1; 301/125
[58] Field of Search .................... 180/374, 337, 180/344, 376, 379, 380, 312, 22; 280/781; 301/124.1, 129, 137, 125

[56] References Cited

U.S. PATENT DOCUMENTS

| Re. 15,149 | 7/1921 | Davison | 180/380 |
|---|---|---|---|
| 5,076,391 | 12/1991 | Ljungholm et al. | 180/379 |
| 5,255,754 | 10/1993 | Lauronen | 180/24.01 |

FOREIGN PATENT DOCUMENTS

| 0086299 | 8/1983 | European Pat. Off. | |
| 84895 | 10/1991 | Finland | |
| 2156783 | 5/1973 | Germany | 180/379 |
| 2552192 | 6/1977 | Germany | |
| 467098 | 5/1992 | Sweden | |

*Primary Examiner*—Eric D. Culbreth

[57] ABSTRACT

The invention relates to a support arrangement for a divided articulated shaft in a vehicle comprising at least one driving axle (2) and at least one non-driving supporting axle (1), in which arrangement the articulated shaft (11) passes through the non-driving axle (1) and is supported near it to substantially follow the vertical movements of the non-driving axle (1), this axle being in turn supported from its middle to the frame (5) of the vehicle by means of an axle supporting unit (4). In order to avoid the lateral shifts and torsions of the articulated shaft (11), the shaft is supported onto said supporting unit (4) in the middle of the axle.

10 Claims, 6 Drawing Sheets

SUPPORT ARRANGEMENT FOR A DIVIDED ARTICULATED SHAFT

The invention relates to a support arrangement for a divided articulated shaft in a vehicle comprising at least one driving axle and at least one non-driving supporting axle, in which arrangement the articulated shaft passes through the non-driving axle and is supported near it to substantially follow the vertical movements of the non-driving axle, this axle being in turn supported from its middle onto the frame of the vehicle by means of an axle supporting unit.

In this type of known arrangement, an articulated shaft, which is provided at least near the non-driving axle with additional articulation enabling its "flexibility", is supported near the non-driving axle in such a way that the flexible movements of this axle do not essentially affect the operation of the articulated shaft.

A known arrangement is disclosed in Swedish Patent 467 098. The articulated shaft in this arrangement comprises two parts and is provided with a link element connecting the parts of the articulated shaft, the ends of the element being mounted in bearings to a separate bearing housing arranged on the non-driving axle. The drawback of this and other known arrangements is that they are not well suited to cases wherein the non-driving axle is a turning axle in which the entire axle beam turns. When the articulated shaft is supported directly on a turning axle, the angles of articulation become disadvantageous when the axle is turned and cause torsional vibration in the articulated shaft, thus reducing its life. Also, these arrangements always require an additional link element.

The purpose of the present invention is to eliminate this drawback. This object is achieved with the arrangement according to the invention, characterized in that the articulated shaft is supported onto said supporting unit in the middle of the axle, the unit only following the vertical movement of the axle.

The invention is thus based on the idea of supporting an articulated shaft indirectly onto a non-driving axle by means of such a component in the axle group that does not turn with respect to the frame of the vehicle, but only follows the vertical movement of the axle.

In the arrangement according to the invention, wherein the articulated shaft rests for example on a so-called triangular support sustaining the shaft, turning the axle does not affect the angles of articulation at all. The support arrangement according to the invention can be realized by means of one or several supports. If one support is utilized, it must allow not only the rotation of the articulated shaft, but also a change in the angle between the articulated shaft and the triangular support. An alternative arrangement utilizes two supports and a separate link shaft, which can be used in situations where the change in the angle between the supporting unit and the articulated shaft tends to become great, whereupon the angular movement of the support is not sufficient.

Figure 2:
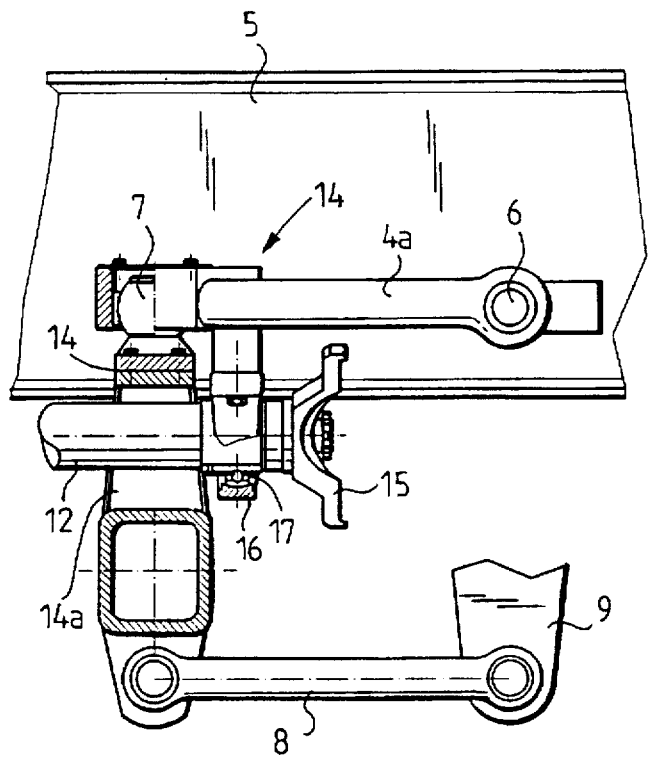
Figure 3:
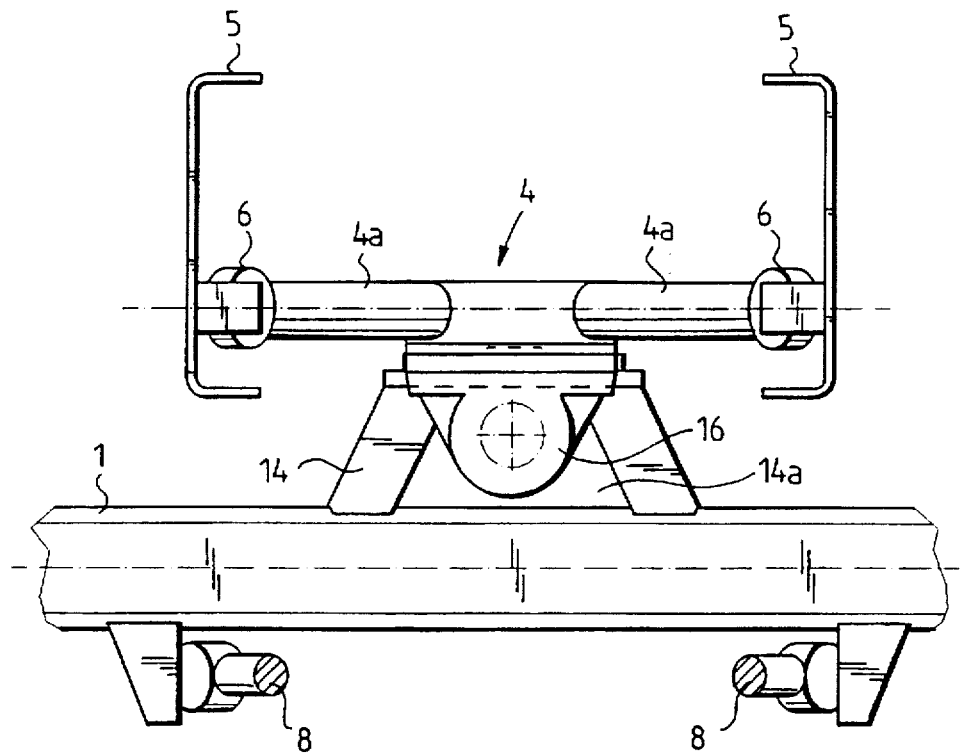
Figure 4:
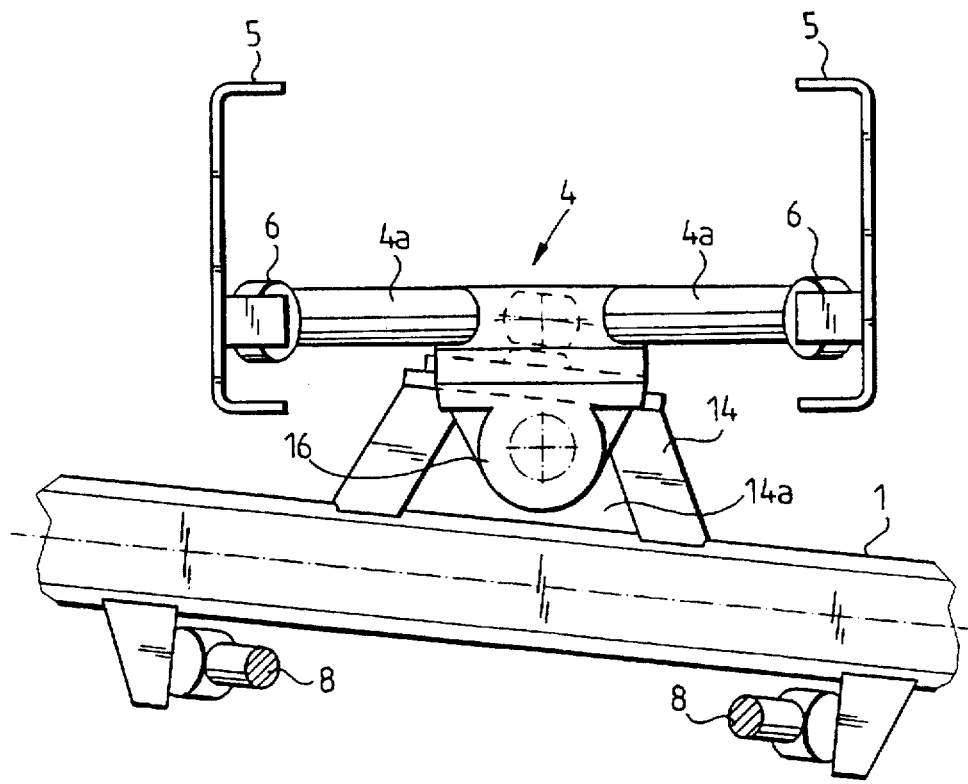
Figure 5:
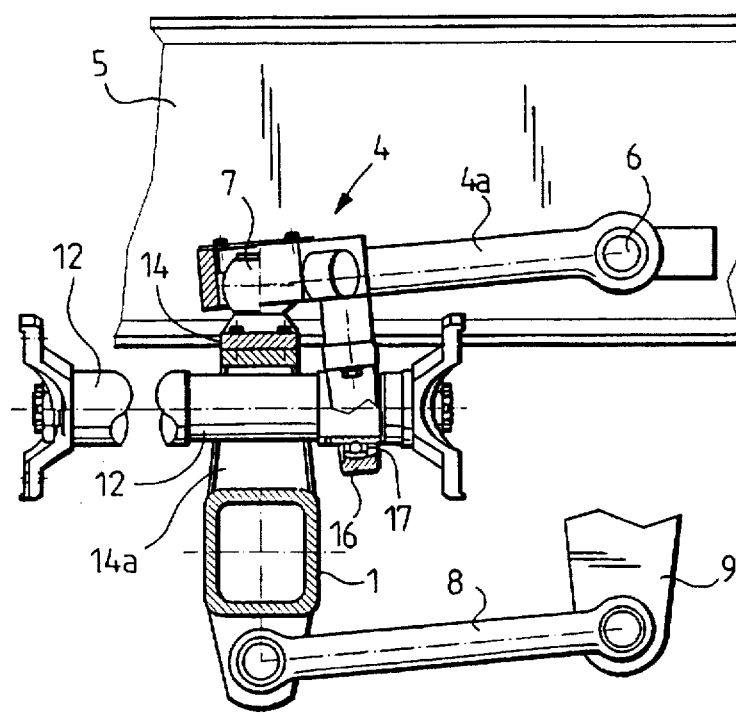
Figure 6:
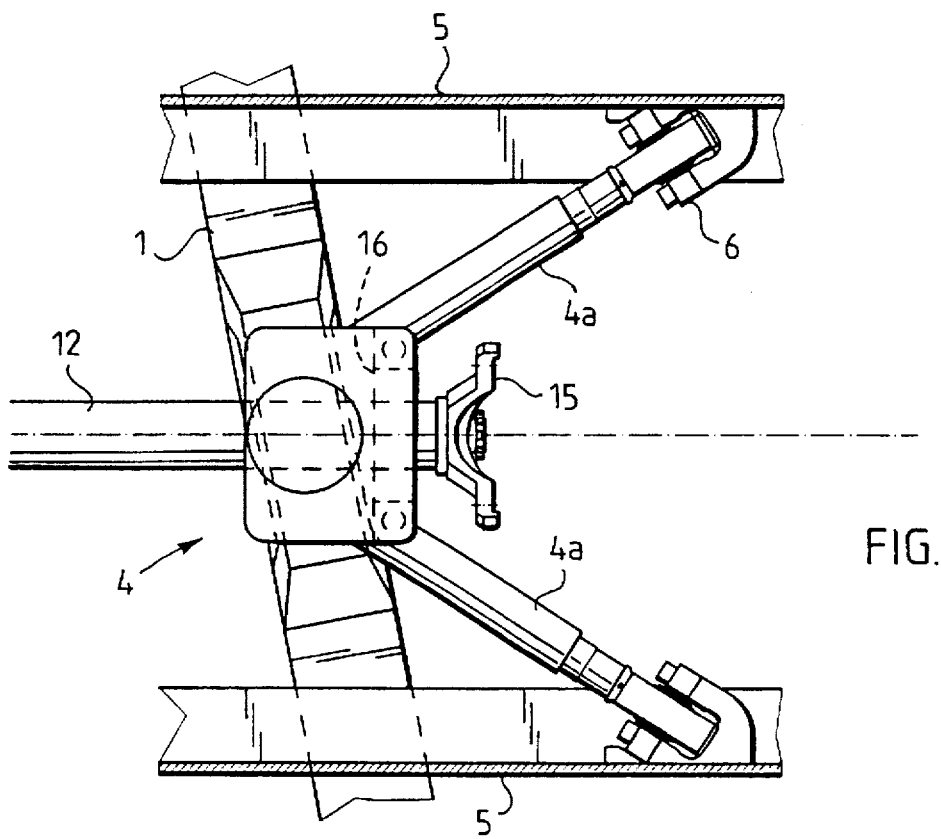
Figure 7:
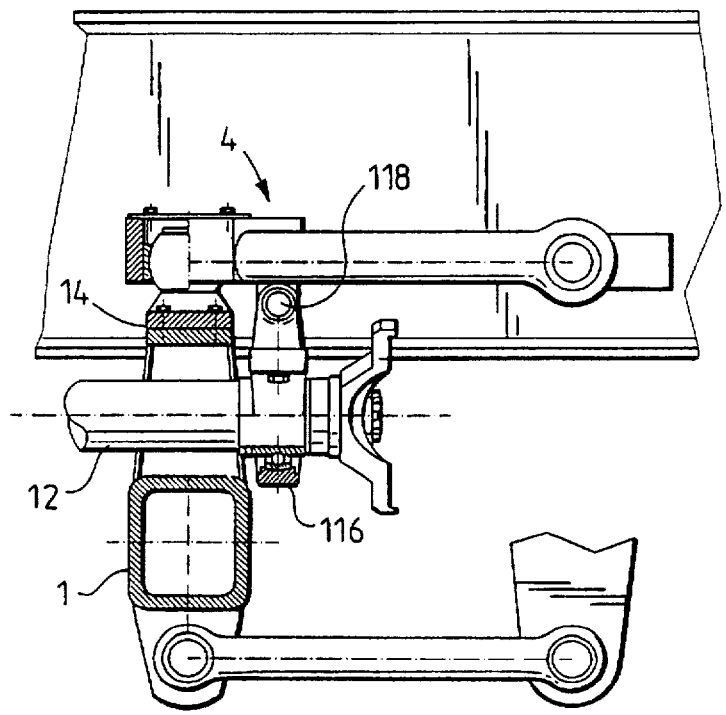
Figure 8:
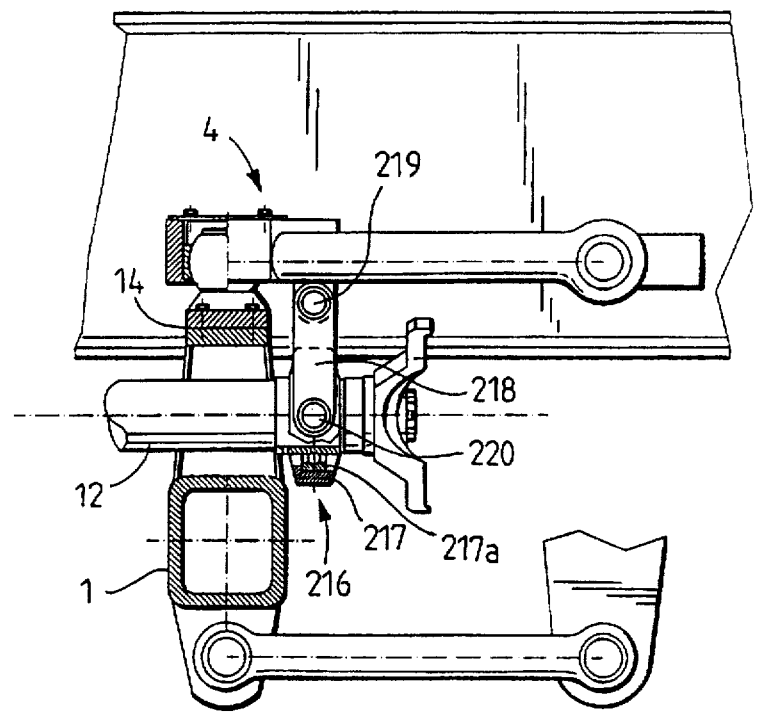
Figure 9:
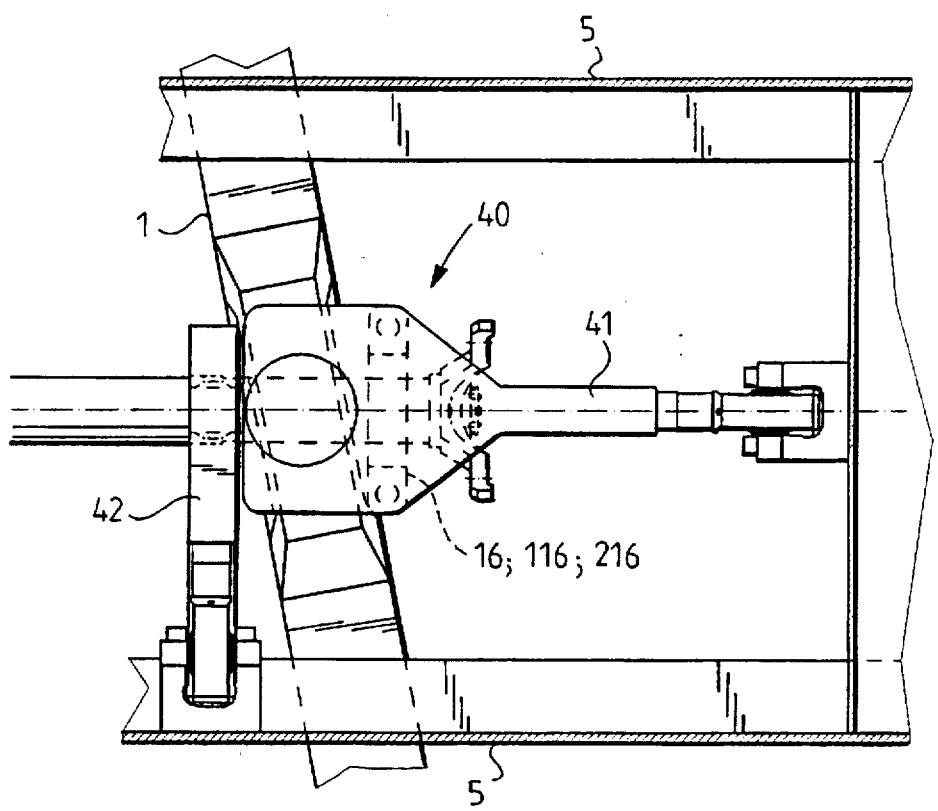
Figure 10:
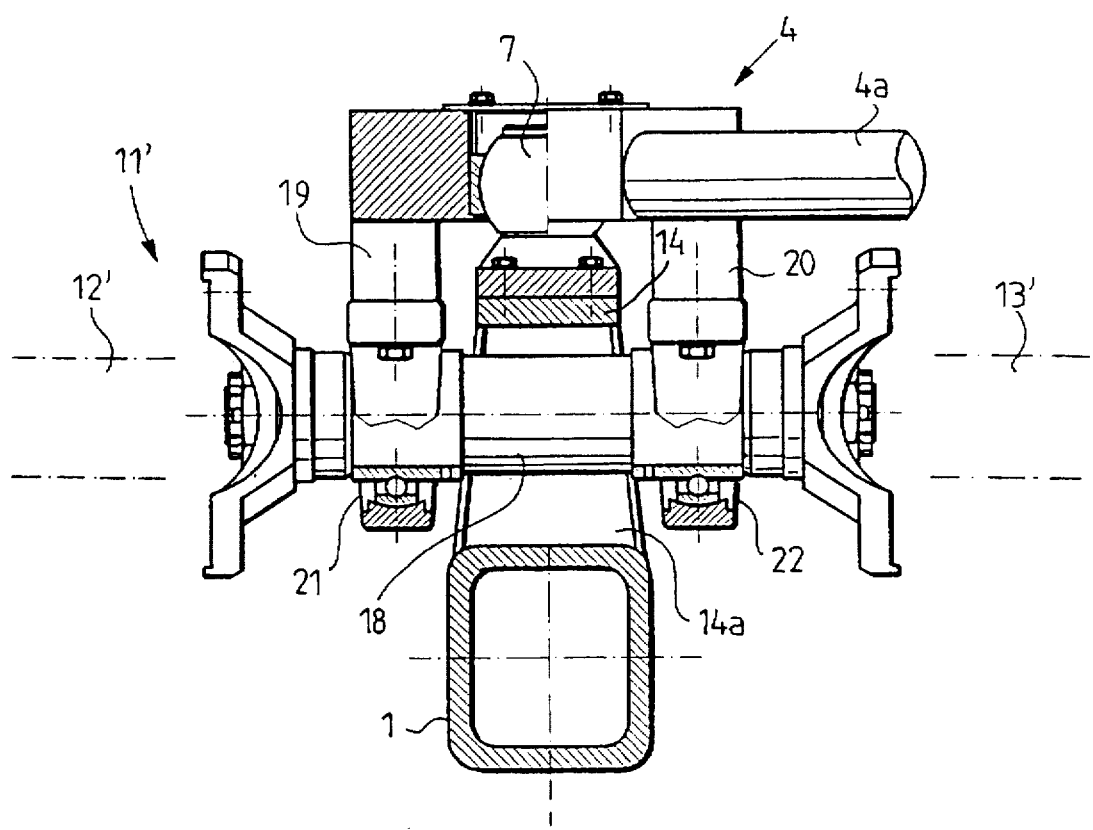

In the following, the invention will be described in greater detail with reference to the accompanying drawings, in which FIG. 1 is a side view of a preferred arrangement according to the invention in an axle structure of a vehicle, comprising a non-driving and a driving axle, FIG. 2 is a more detailed side view of the arrangement according to FIG. 1 on a larger scale, FIG. 3 shows the arrangement according to FIG. 1 on a larger scale, viewed from behind the non-driving axle, FIG. 4 shows an arrangement similar to FIG. 3 in a situation where the non-driving axle is tilted, FIG. 5 shows an arrangement similar to FIG. 2 in a situation where the non-driving axle moves vertically, FIG. 6 is a top view of the arrangement according to the preceding figures in a situation where the axle turns, FIGS. 7 and 8 are side views of two alternative preferred arrangements according to the invention, FIG. 9 is a top view of another alternative arrangement according to the invention, and FIG. 10 is a side view of yet another preferred alternative arrangement according to the invention.

The axle structure of a vehicle, shown in FIG. 1, comprises at least the non-driving supporting axle 1 and the driving axle 2 shown in the figure. Wheels connected to the axles are denoted with reference numeral 3. The axles 1 and 2 are supported from above and from the middle by means of a triangular support 4 onto opposite sides of the frame 5 of the vehicle by means of joints 6. The arms of the triangular support 4, connected to the joints 6, are denoted with reference numeral 4a (FIGS. 3, 4 and 6). The support arrangement between the axles 1 and 2, and the triangular supports 4 are provided with a ball joint 7, which is shown most clearly in FIGS. 2 and 5. The axles 1 and 2 are also supported from their ends with longitudinal supports 8 situated below the axles onto opposite sides of the vehicle frame 5 by means of clamp supports or levers 9 directed downward from the frame 5. This support arrangement is a known structure that is described in greater detail for example in Finnish Patent 84895. Therefore the spring suspension related to the supporting of the axles, as well as other vehicle components that are not necessary for understanding the invention will not be described here.

In connection with the driving axle 2, there is back transmission mechanism 10 which is joined by an articulated shaft 11 comprising at least two parts 12, 13 and passing from the power source (not shown) of the vehicle through the non-driving axle, for driving the wheels connected to the axle 2.

The middle of the non-driving axle 1 is supported onto the triangular support 4 by means of a stand 14 mounted on the non-driving axle 1, so that the articulated shaft 11 passes through an opening 14a provided in the aforementioned stand 14.

In the embodiment according to FIGS. 1 to 6, the articulated shaft 11 is divided near the non-driving axle 1 in such a way that the hinge joint 15 of the parts 12 and 13 of the articulated shaft is situated behind the axle 1, and the part 12 of the articulated shaft is supported onto the triangular support 4 by means of an articulated shaft support 16 which also extends to the back of the axle 1, downward from the triangular support 4 and behind the stand 14. The articulated shaft support 16 is a bearing block comprising a bearing 17 that enables the rotation of the part 12 of the articulated shaft, the bearing also being capable of turning around an axis that is transverse with respect to the vehicle, in order to enable a change in the angle between the part 12 of the articulated shaft and the bearing block 16 (triangular support 4) during the vertical movement of the axle 1.

This support arrangement according to the invention for an articulated shaft allows the axle of FIGS. 4, 5 and 6 to tilt, move vertically and turn without harmful effects on the operation of the articulated shaft 11.

FIG. 7 shows a support arrangement which only differs from the arrangement according to the preceding figures in that between the articulated shaft support 116 and the supporting unit 4 there is a joint 118 enabling the turning of the articulated shaft support 116 with respect to the supporting unit 4 around an axis that is transverse with respect to the vehicle. This arrangement allows a change in the angle of the articulated shaft 11 without longitudinal glide required in the articulated shaft 11. On the other hand, if the articulated shaft comprises longitudinal glide (not shown in the figures), articulation enabling a change of angle is not necessarily required.

FIG. 8 shows another alternative support arrangement which in turn differs from the arrangement of FIGS. 1 to 6 only in that the articulated shaft support 216 comprises a separate supporting bearing housing 217 and a connecting bar 218 arranged between the housing and the supporting unit 4, the bar being articulated from one end to the supporting bearing housing 217 and from the other end to the supporting unit 4 with joints 219 and 220 that enable turning between the articulated shaft support components 217 and 218, and the supporting unit 4, around axes that are transverse with respect to the vehicle. In such a case, no longitudinal glide is required in the articulated shaft 11, nor is bearing application enabling a change in the angle of the articulated shaft 11 required in the supporting bearing 217a.

FIG. 9 shows a support arrangement wherein the supporting unit 40 comprises a separate longitudinal support 41 and a separate transverse support 42. The articulated shaft 11 may then rest on either support 41, 42. However, this figure shows a support arrangement that is based on the longitudinal support and that may therefore be any of the support arrangements according to FIGS. 1 to 8.

If the change in the angle between the triangular support 4 and the articulated shaft 11 tends to become great, it is preferable to utilize the structure according to FIG. 10, whereupon the articulated shaft 11' is taken through the opening 14a in the stand 14 by means of a link shaft 18 connecting the parts 12' and 13' of the articulated shaft, the ends of the link shaft being mounted in bearings, by means of bearings 21 and 22 provided in the bearing blocks, to articulated shaft bearing blocks 19 and 20 that are directed downward from the triangular support 4 to opposite sides of the stand 14.

The invention is described above with reference to drawings by means of only a few preferred embodiments. The drawings do not separately show for example such alternative embodiments wherein the articulated shaft is supported onto the front of the non-driving axle 1 by means of an articulated shaft support that extends downward from the axle supporting unit (triangular support 4 or transverse support 42) to the front of the stand 14, since these arrangements correspond otherwise substantially to FIGS. 1 to 8. A person skilled in the art can also implement the details of the invention in several alternative ways within the scope of the appended claims, since the only essential feature is that the articulated shaft is supported onto such a support component of the non-driving axle that always maintains the articulated shaft in the same line parallel to the longitudinal axis of the vehicle.

I claim:

1. A support arrangement for a divided articulated shaft in a vehicle having a frame, at least one driving axle and at least one turning non-driving axle having a middle for the divided articulated shaft to pass across the turning non-driving axle to the driving axle, the support arrangement comprising:

supporting unit means for supporting a turning non-driving axle from about its middle on a frame of a vehicle; and means for supporting a divided articulated shaft on the supporting unit means at about the middle of the turning non-driving axle for following only vertical movement of the turning non-driving axle.

2. The support arrangement according to claim 1, wherein the supporting unit means comprises a stand on the turning non-driving axle, wherein the divided articulated shaft passes through the stand.

3. The support arrangement according to claim 2, wherein the means for supporting the divided articulated shaft is on a side of the turning non-driving axle facing a driving axle and comprises an articulated shaft support extending from the supporting unit means to a side of the stand facing the driving axle.

4. The support arrangement according to claim 3, and further comprising a joint between the articulated shaft support and the supporting unit means for allowing the articulated shaft support to turn with respect to the supporting unit means around an axis that is generally parallel to the turning non-driving axle.

5. The support arrangement according to claim 3, wherein the articulated shaft support comprises a supporting bearing housing and a connecting bar, one end of the connecting bar being articulated to the supporting bearing housing and an opposite end of the connecting bar being articulated to the supporting unit means with joints that enable turning between the articulated shaft support and the supporting unit means around axes that are generally parallel to the turning non-driving axle.

6. The support arrangement according to claim 2, wherein the means for supporting the divided articulated shaft is on a side of the turning non-driving axle opposite a driving axle and comprises an articulated shaft support extending from the supporting unit means to a side of the stand opposite the driving axle.

7. The support arrangement according to claim 6, and further comprising a joint between the articulated shaft support and the supporting unit means for allowing the articulated support to turn with respect to the supporting unit means around an axis that is generally parallel to the turning non-driving axle.

8. The support arrangement according to claim 6, wherein the articulated shaft support comprises a supporting bearing housing and a connecting bar, one end of the connecting bar being articulated to the supporting bearing housing and an opposite end of the connecting bar being articulated to the supporting unit means with joints that enable turning between the articulated shaft support and the supporting unit means around axes that are generally parallel to the turning non-driving axle.

9. The support arrangement according to claim 2, wherein the supporting unit means comprises, with respect to the turning non-driving axle, a longitudinal support and a separate transverse support, wherein the divided articulated shaft is supported on at least one of the longitudinal and transverse supports.

10. The support arrangement according to claim 2, wherein the divided articulated shaft passes through the stand by means of a link connecting divided parts of the divided articulated shaft, opposite ends of the link shaft being mounted in bearings to articulated shaft bearing blocks extending from the supporting unit means to opposite ends of the stand.

* * * * *